US008798603B2

(12) United States Patent  
Hawkins et al.

(10) Patent No.: US 8,798,603 B2  
(45) Date of Patent: Aug. 5, 2014

(54) SYSTEM AND METHOD FOR PROVIDING EMERGENCY CALL FORWARDING SERVICES

(75) Inventors: Johnny Hawkins, Kansas City, MO (US); Rich Schermerhorn, Overland Park, KS (US); Victoria M. Toner, Sheboygan, WI (US); Shekhar Gupta, Overland Park, KS (US); Mike A. Roberts, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 873 days.

(21) Appl. No.: 12/172,772

(22) Filed: Jul. 14, 2008

(65) Prior Publication Data

US 2010/0009665 A1 Jan. 14, 2010

(51) Int. Cl.
*H04M 3/42* (2006.01)
*H04W 24/00* (2009.01)
*H04M 11/04* (2006.01)

(52) U.S. Cl.
USPC .................. 455/417; 455/456.1; 455/404.2

(58) Field of Classification Search
CPC ............. H04M 2242/30; H04M 3/54; H04M 3/42263; H04M 3/42; H04M 1/006; H04M 2250/10; H04M 3/42348; H04M 3/5116; H04M 2203/2005; H04M 2203/2016; H04M 2203/2038; H04M 2242/04; H04W 68/00; H04W 76/007; H04W 36/32
USPC .......................... 455/417, 414.2, 440, 456.1
See application file for complete search history.

(56) References Cited

U.S. PATENT DOCUMENTS

| 5,559,859 | A | * | 9/1996 | Dai et al. ..................... 455/459 |
| 5,619,556 | A | * | 4/1997 | Richardson et al. ....... 379/88.22 |
| 6,363,248 | B1 | * | 3/2002 | Silverman .................... 455/417 |
| 6,584,316 | B1 | | 6/2003 | Akhteruzzaman et al. |
| 6,856,806 | B1 | | 2/2005 | Bosik et al. |
| 6,975,874 | B1 | | 12/2005 | Bates et al. |
| 6,999,757 | B2 | | 2/2006 | Bates et al. |
| 7,082,192 | B2 | | 7/2006 | Weaver |
| 7,103,366 | B2 | | 9/2006 | Bates et al. |
| 7,130,643 | B2 | | 10/2006 | Bates et al. |
| 7,251,494 | B2 | | 7/2007 | Bates et al. |

(Continued)

OTHER PUBLICATIONS

U.S. Appl. No. 12/146,118; Non-Final Rejection dated Sep. 14, 2011; 12 pgs.

(Continued)

*Primary Examiner* — George Eng
*Assistant Examiner* — Jing Gao
(74) *Attorney, Agent, or Firm* — Swanson & Bratschun, L.L.C.

(57) ABSTRACT

A system and method for forwarding a telephone call includes routing a telephone call from a calling party to a first telephone of a called party. A determination may be made that the telephone call was not answered by the called party. A determination may be made as to whether the telephone call is to be forwarded to an unrelated second telephone within a predetermined distance of the first telephone. Geographic coordinates of the first telephone may be determined. A determination of geographic coordinates of at least one second telephone may be made. A determination as to whether the at least one unrelated second telephone is within the predetermined distance of the first telephone. An unrelated second telephone determined to be within the predetermined distance of the first telephone may be selected. The telephone call may be forwarded to the selected unrelated second telephone.

16 Claims, 4 Drawing Sheets

(56) References Cited

U.S. PATENT DOCUMENTS

| | | |
|---|---|---|
| 8,175,246 B2 | 5/2012 | Toner et al. |
| 8,462,932 B2 * | 6/2013 | Toner et al. ............... 379/211.02 |
| 2003/0134648 A1 * | 7/2003 | Reed et al. .................... 455/456 |
| 2004/0234056 A1 * | 11/2004 | Heilmann et al. ............. 379/196 |
| 2005/0009524 A1 * | 1/2005 | Garani et al. .................. 455/445 |
| 2007/0003026 A1 * | 1/2007 | Hodge et al. ................. 379/88.1 |
| 2008/0064375 A1 * | 3/2008 | Gottlieb ..................... 455/414.1 |
| 2008/0081638 A1 * | 4/2008 | Boland et al. .............. 455/456.1 |
| 2009/0323919 A1 | 12/2009 | Toner et al. |
| 2010/0240343 A1 | 9/2010 | Russell |
| 2012/0196606 A1 * | 8/2012 | Toner et al. ................... 455/445 |

OTHER PUBLICATIONS

U.S. Appl. No. 12/146,118; Notice of Allowance dated Jan. 9, 2012; 7 pgs.

U.S. Appl. No. 12/146,118; Issue Notification dated Apr. 18, 2012; 1 pg.

U.S. Appl. No. 13/445,694; Issue Notification dated May 22, 2013; 1 page.

U.S. Appl. No. 13/445,694; Notice of Allowance dated Feb. 13, 2013; 10 pages.

U.S. Appl. No. 13/445,694; Non-Final Rejection dated Jan. 15, 2013; 10 pages.

* cited by examiner

SYSTEM AND METHOD FOR PROVIDING EMERGENCY CALL FORWARDING SERVICES

BACKGROUND

With the advancement of mobile telecommunication services, it has become significantly easier to contact people, whether at home, at work, or elsewhere. Even though society has transformed from a society without mobile communications to one where a majority of people carry a mobile telephone at all times, there are many reasons why someone with a mobile telephone would not know that someone is calling the mobile telephone despite having the mobile telephone with him or her. For example, someone with a mobile telephone in his or her pocket might have the mobile telephone on a low volume or "beep" ring due to being recently at work and not hear the mobile telephone ring. As another example, a woman who has her telephone in her purse might not hear the mobile telephone ringing or feel vibration of the mobile telephone. Many other examples could additionally be provided to show that a user of a mobile telephone is not always aware that his or her mobile telephone is ringing.

In the event of a emergency, a caller who is attempting to reach someone with a mobile telephone who is not answering the mobile telephone for any reason has few, if any, options to reach the person if the person being called is away from work, home, or other easily reachable location (e.g., hotel). Unless the caller has a telephone number of another person who might be with the person the caller is attempting to reach, the caller has to wait for the person to check his or her telephone to see that the caller has been attempting to reach the person. In an emergency or other important situation, any delay in contacting someone may be too long.

SUMMARY

To overcome the problem of someone not answering his or her telephone in an emergency or other important situation, the principles of the present invention provide for location identification technology, such as Global Positioning System (GPS) or triangulation technology, to be utilized to identify a location of (i) a called party by determining the location of his or her mobile telephone and (ii) another mobile telephone of another user located within a predetermined distance (e.g., 30 feet) from the mobile telephone of the called party. A call placed to the mobile telephone of the user may be forwarded or re-routed to the mobile telephone of another user within the predetermined distance so that the other user may locate the called party to facilitate the emergency telephone call. In one embodiment, an automated message may be communicated to the other user to notify the other user that an emergency call is being forwarded to the other user's telephone and request that the other user accept or reject the emergency telephone call. By enabling the other user to accept or reject the emergency telephone call, the emergency telephone call is less intrusive than if the caller were directly connected to the telephone of the other user. However, such an embodiment is contemplated.

One system and method for forwarding a telephone call includes routing a telephone call from a calling party to a first telephone of a called party. A determination may be made that the telephone call was not answered by the called party. A determination may be made as to whether the telephone call is to be forwarded to another telephone within a predetermined distance of the first telephone of the called party. Geographic coordinates of the first telephone may be determined. A determination of geographic coordinates of at least one second telephone may be made. A determination as to whether the at least one unrelated second telephone is within the predetermined distance of the first telephone, where an unrelated second telephone is a telephone that neither the calling party nor the called party previously set-up to forward an emergency call. An unrelated second telephone determined to be within the predetermined distance of the first telephone may be selected. The telephone call may be forwarded to the selected unrelated second telephone.

BRIEF DESCRIPTION OF DRAWINGS

Illustrative embodiments of the present invention are described in detail below with reference to the attached drawing figures, which are incorporated by reference herein and wherein.

DETAILED DESCRIPTION OF DRAWINGS

Figure 1:
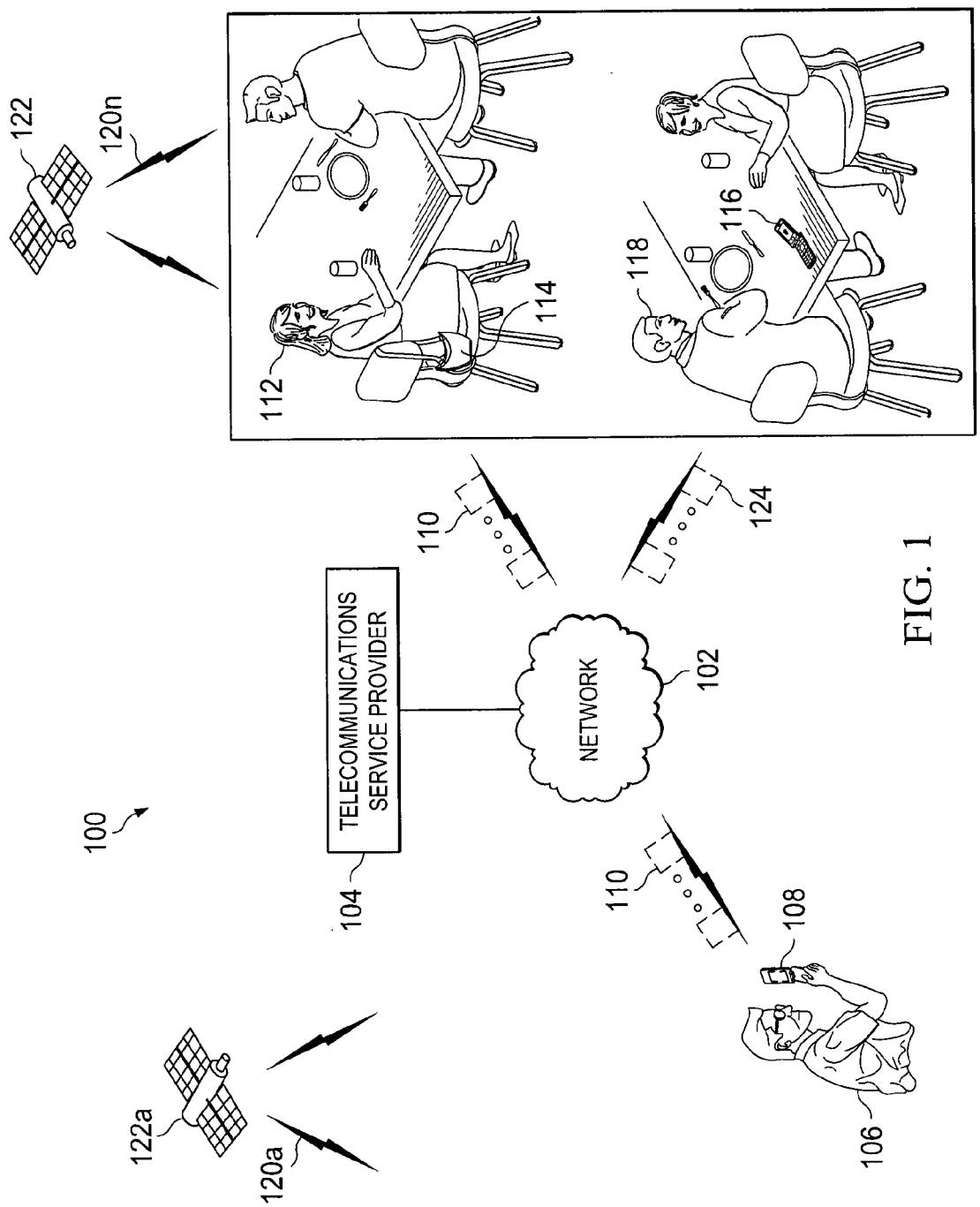
FIG. 1 is an illustration of an illustrative network environment for providing emergency call forwarding services in accordance with the principles of the present invention.

With regard to FIG. 1, an illustrative telecommunications network environment 100 is shown to include a telecommunications network 102 over which subscribers of a telecommunication service provided 104 may communicate. In one embodiment, the telecommunications network 102 may be a mobile telecommunications network, Internet, or any other network over which voice communications may be communicated. In general, users of telephones, such as mobile telephones, WiFi telephones, and home telephones, communicate via the network 102 to contact other users of telephones. In the case of mobile telephones, it is not uncommon for a mobile telephone user to not answer his or her telephone due to being on the telephone or not knowing that the telephone is ringing.

As shown in the network environment 100, a calling party 106 using a telephone 108, such as a mobile telephone, may communicate via the network 102 using data packets 110. If the calling party 106 is attempting to call a called patty 112 who does not answer her mobile telephone (not shown) because her telephone is in her purse 114 while eating at a restaurant, the principles of the present invention may be provide for the telephone call of the calling party 106 to be re-routed to attempt to reach another telephone, such as mobile telephone 116 of another user 118, that is physically located within a predetermined distance from the mobile telephone of the called party 112. The predetermined distance may be determined in a number of ways, including using Global Positioning System (GPS) technology that may enable the mobile telephone to be geographically located with geographic coordinates based on GPS signals 120a-120n (collectively 120) from Global Positioning System satellites 122a-122n (collectively 122). As understood in the art, a wireless device that receives the Global Positioning System signals 120 may determine its approximate geographic coordinates and communicate those geographic coordinates via a terrestrial network, such as network 102.

The telecommunications service provider 104 may receive the GPS coordinates of the mobile telephone that is within the purse 114 of the called party 112. In determining the GPS coordinates, the telecommunications service provider may access a data repository (see FIG. 2) to determine locations of other telephones of other, unrelated subscribers to determine whether another telephone, such as a mobile telephone, resides within a predetermined distance (e.g., 30 feet) from the telephone of the called party 112. If so, then the call to the called party 112 may be routed to an unrelated telephone within the predetermined distance from the telephone of the called party 112.

In being unrelated, neither the calling party 106 not the called party 112 has pre-established the telephone number of the unrelated telephone of the other, unrelated subscriber to forward or re-route an emergency telephone call. In other words, the unrelated telephone is determined "on the fly" as a telephone owned by a subscriber that is local or within a predetermined distance of the telephone of the called party 112.

As shown, data packets 124 may be utilized to route the telephone call to the mobile telephone 116 of the user 118. It should be understood that the predetermined distance may be any distance. In one embodiment, the predetermined distance may be altered when attempting to locate a telephone local to the telephone of the called party 112, such as by progressively increasing distance until a local telephone is identified.

Figure 2:
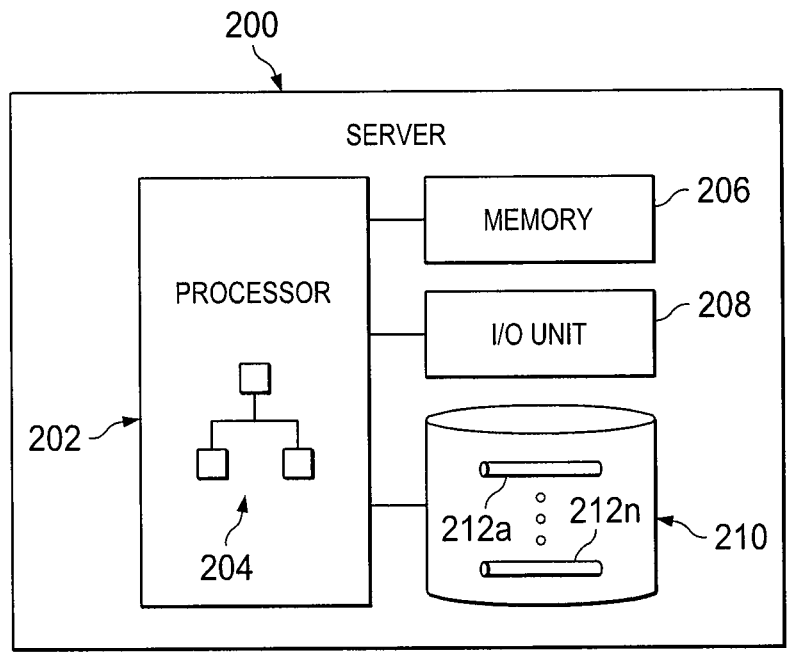
FIG. 2 is a block diagram of an illustrative server configured to provide for emergency call forwarding services.

With regard to FIG. 2, server 200 may be managed by a telecommunications service provider, such as telecommunications service provider 104 of FIG. 1, and be configured to provide for the emergency call forwarding services in accordance with the principles of the present invention. The server 200 may include a processing unit 202 that includes one or more computer processors that execute software 204. The software 204 may be configured to provide for the emergency call forwarding services. The processing unit 202 may be in communication with memory 206, input/output (I/O) unit 208, and storage unit 210. The storage unit 210 may store data repositories 212a-212n (collectively 212). The memory 206 may be configured to store data, such as GPS location data of mobile telephones, and software being executed by the processing unit 202. The I/O unit 208 may be configured to communicate over a telecommunications network for routing and re-routing telephone calls. The data repositories 212 may be configured to store subscriber and telephone information of respective subscribers. In one embodiment, the data repositories 212 may maintain current geographic coordinates of telephones of subscribers. In one embodiment, the geographic coordinates are global positioning coordinates. Alternatively, the geographic coordinates may be ascertained through triangulation or other coordinate positioning techniques, as understood in the art.

TABLE I is an illustrative listing of telephone numbers of subscribers of a telecommunications service provider. The telephones associated with each of the telephone numbers include GPS devices that are capable of providing current GPS coordinates. The current GPS coordinates may be used to calculate a relative distance between a called telephone and each respective telephone. As shown, the telephone with telephone number 214 259-5678 has a relative distance of 12.4 feet, which is within a predetermined range of 30 feet. If a caller to the called telephone has an emergency or important message in which the caller needs to reach the called party, then the telephone call may be routed to the telephone within the predetermined range, as further described herein.

TABLE I

| Telephone Number | Lat. | Long. | Relative Dist. (ft) |
|---|---|---|---|
| 214 405-1234 | 32.78333 | −96.78703 | 7421.4 |
| 214 758-9876 | 32.47281 | −96.78427 | 142.9 |
| 214 259-5678 | 32.47282 | −96.78423 | 12.4 |
| ... | ... | ... | ... |

Figure 3:
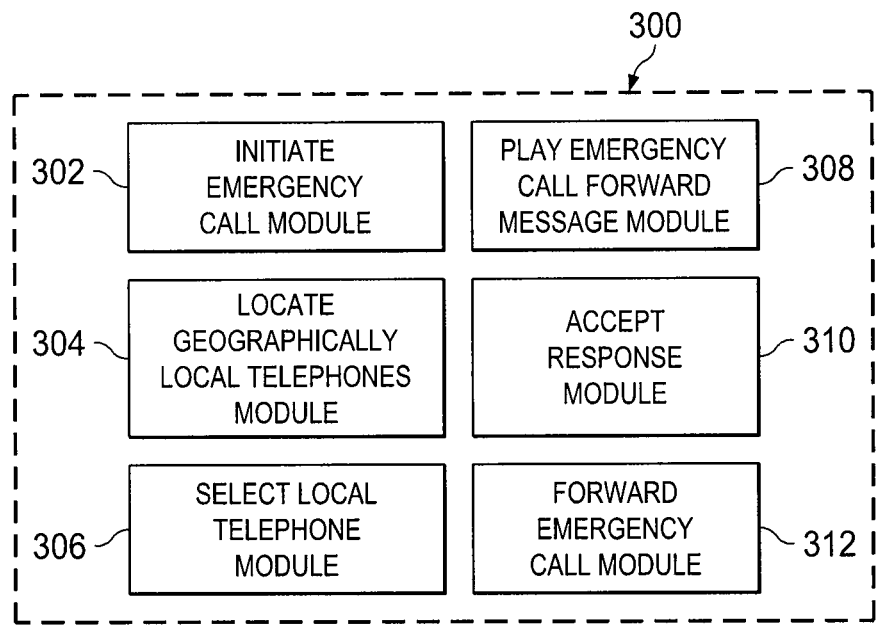
FIG. 3 is a block diagram of illustrative software modules for providing emergency call forwarding services.

With regard to FIG. 3, modules 300 may be software modules that are executed on server 200 of FIG. 2 for providing emergency call forwarding services in accordance with the principles of the present invention. An initiate emergency call module 302 may be configured to determine that a called party did not pick up a telephone call and initiate the emergency call forwarding service. In initiating the emergency call forwarding services, the initiate emergency call module 302 may be configured to determine that a calling party has pre-established that any call not answered by a called party should provide the option to the calling party as to whether or not to initiate an emergency call process. In an alternative embodiment, the initiate emergency call module 302 may determine whether the called party has pre-established certain telephone numbers (e.g., a husband's telephone number) for initiating an emergency call forwarding services. Still yet, a caller may submit an emergency call code (e.g., *911) as a prefix to dialing the telephone number of the called party (e.g., "*9112142591234"). Alternative embodiments may be utilized to initiate the emergency call forwarding services. The prefix is used to instruct the initiate emergency call module 302 to re-route or forward the telephone call to the telephone number if the call is not answered by a user of the called telephone.

A locate geographically local telephones module 304 may be configured to locate other telephones local to a called telephone. In determining whether another telephone is local to a called telephone, a determination of the geographic coordinates of the called telephone may be performed along with a determination of geographic coordinates of other telephones. A determination of distance between the called telephones and other telephones may be performed using conventional mathematical distance equations to determine proximity of the called telephone from other telephones of which geographic coordinates are known. In one embodiment, GPS coordinates of the called telephone and other telephones may be applied to a mathematical distance equation, as understood in the art, to determine whether the called telephone is within a predetermined distance (e.g., within 30 feet) of the called telephone.

A select local telephone module 306 may be configured to select which, if any, telephone local to the called telephone to forward an emergency telephone call. In selecting the local telephone, the select local telephone module 306 may select the local telephone (i.e., a telephone within a predetermined distance) from among any local telephone being closest to the called telephone, having the highest signal strength, or having any other factor or combination of factors. A play emergency call forward message module 308 may be configured to play an emergency call message to a telephone that has been selected to re-route the emergency call to a local telephone as determined by the select local telephone module 306. An emergency call forward message may notify the user of the telephone call that was selected by the select local telephone module 306, where the emergency call forward message may be:

An emergency telephone call has been re-routed to your telephone as a person to whom the emergency call was originally placed did not answer his or her telephone. That person is in your immediate vicinity. Please press the number '1' to accept the call or the number '2' to not accept the call.

In one embodiment, a caller may have the opportunity to speak the name of the original called party and the person's name may be stated in the emergency call forward message. The user who receives the emergency call forward message may press the number '1' to accept the telephone call or the number '2' to reject the telephone call. Should the user accept the telephone call, then the caller may be connected with the user and the caller may explain to the user that he or she is attempting to reach a user within the user's immediate vicinity for whatever purpose. If the user presses the number '2,' then the system may determine whether another telephone is within the predetermined distance of the called telephone and the play emergency call forward module 308 may play the emergency call forward message to the other user with the telephone that is local to the called party.

An accept response module 310 may be configured to accept a response from the user who is called by the play emergency call forward message module 308. The response may be a response to the question as to whether the user is willing to accept or reject the emergency call. If the accept response module 310 determines that the response is to accept the emergency call, then a forward emergency call module 312 may be configured to forward the emergency call by the calling party to the user, thereby allowing the calling party to request that the user of the local telephone to the called party find the called party. Once the called party is located, the user may relay a message to the called party or allow the called party to speak to the calling party on the user's telephone.

Figure 4:
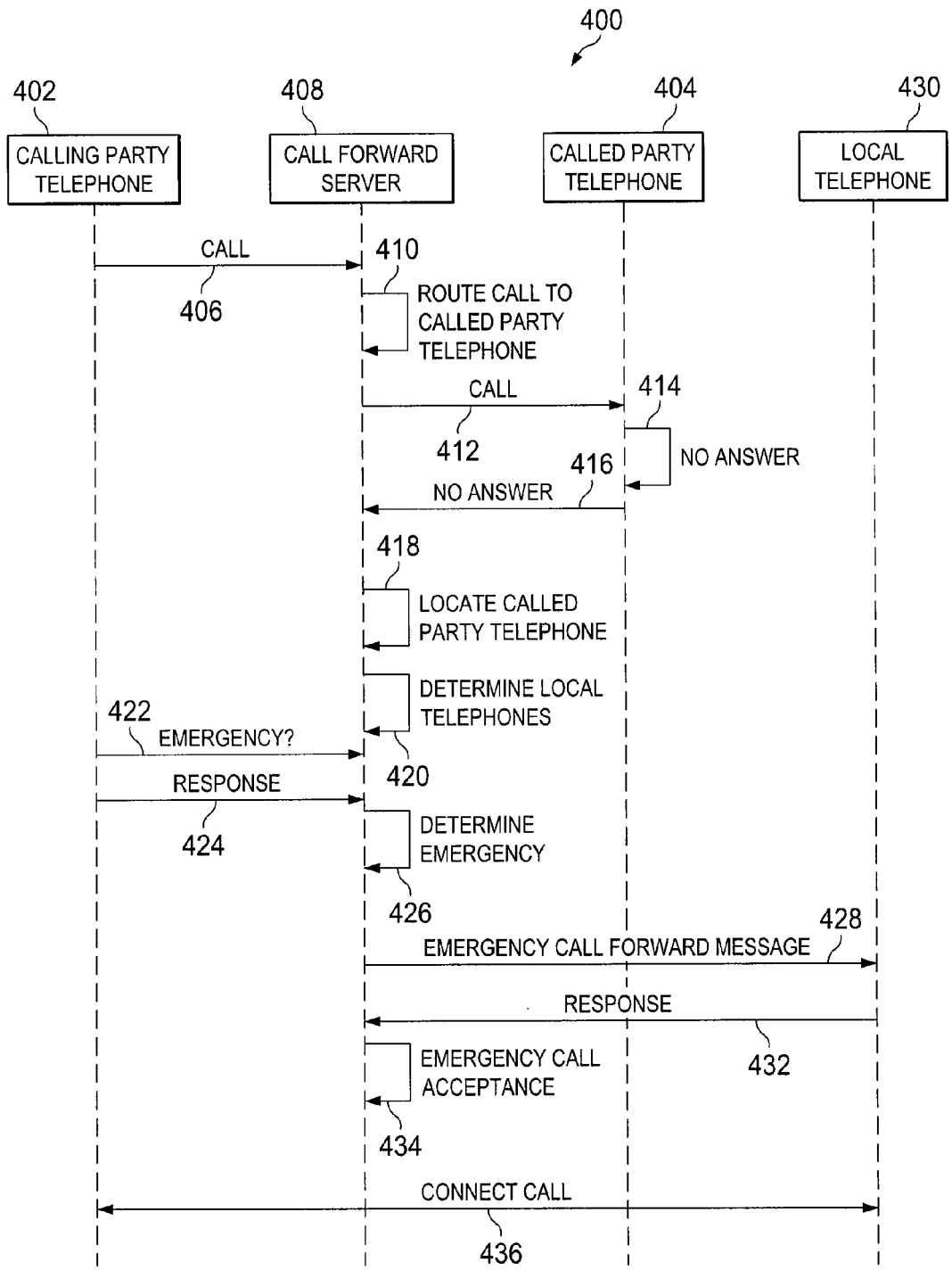
FIG. 4 is a timing diagram of an illustrative process for providing emergency call forwarding services.

With regard to FIG. 4, a calling party telephone 402 may be utilized to call a called party telephone 404. The calling party telephone 402 may be utilized to place a call to the called party telephone 404 and the call, at step 406, may be directed to a call forward server 408. The call forward server 408 may be configured to route the call to the called party telephone at step 410. In routing the call, the call forward server 408 may determine location of the called party telephone in a network, such a mobile telephone network. At step 412, the call may be routed to the called party telephone 404. If a called party does not answer the call on the called party telephone 404 at step 414, then at step 416, a "no answer" signal may be communicated to the call forward server 408. Alternatively, the call forward server 408 may itself determine that the called party did not answer the called party telephone 404.

At step 418, the call forward server 408 may locate the called party telephone by determining geographic coordinates using GPS coordinates or triangulation, for example. At step 420, the call forward server 408 may determine local telephones in relation to the called party telephone. In determining the local telephones, geographic coordinates of telephones, such as mobile telephones, may be determined and a distance equation may be utilized to determine distance of the local telephones from the called party telephone.

Depending on the configuration of the call forward server 408, an emergency query of the calling party may be communicated to the calling party telephone 402 at step 422. The emergency query may include an audio message to the calling party to ask whether the telephone call is an emergency telephone call. The calling party may respond at step 424 to indicate whether the telephone call is an emergency telephone call. At step 426, the call forward server 408 may determine whether the call is an emergency telephone call by examining the response by the calling party. If the call is an emergency telephone call, then at step 428, an emergency call forward message may be communicated to a local telephone 430, where the local telephone 430 may be a telephone of the called party (e.g., a second telephone line) or a telephone owned by an unrelated, third-party. In one embodiment, the emergency call forward message 428 may notify the owner of the telephone that an emergency call is being placed to another person within the immediate vicinity of the local telephone 430 and request whether the person who answered the local telephone 430 is willing to accept the emergency call. The person who answers the local telephone 430 may respond at step 432 to notify the call forward server 408 whether or not the emergency call is accepted. The call forward server 408 may determine whether the emergency call has been accepted at step 434 and, if the emergency call is accepted, then at step 436, the call forward server 408 may connect the calling party telephone 402 and the local telephone 430.

Figure 5:
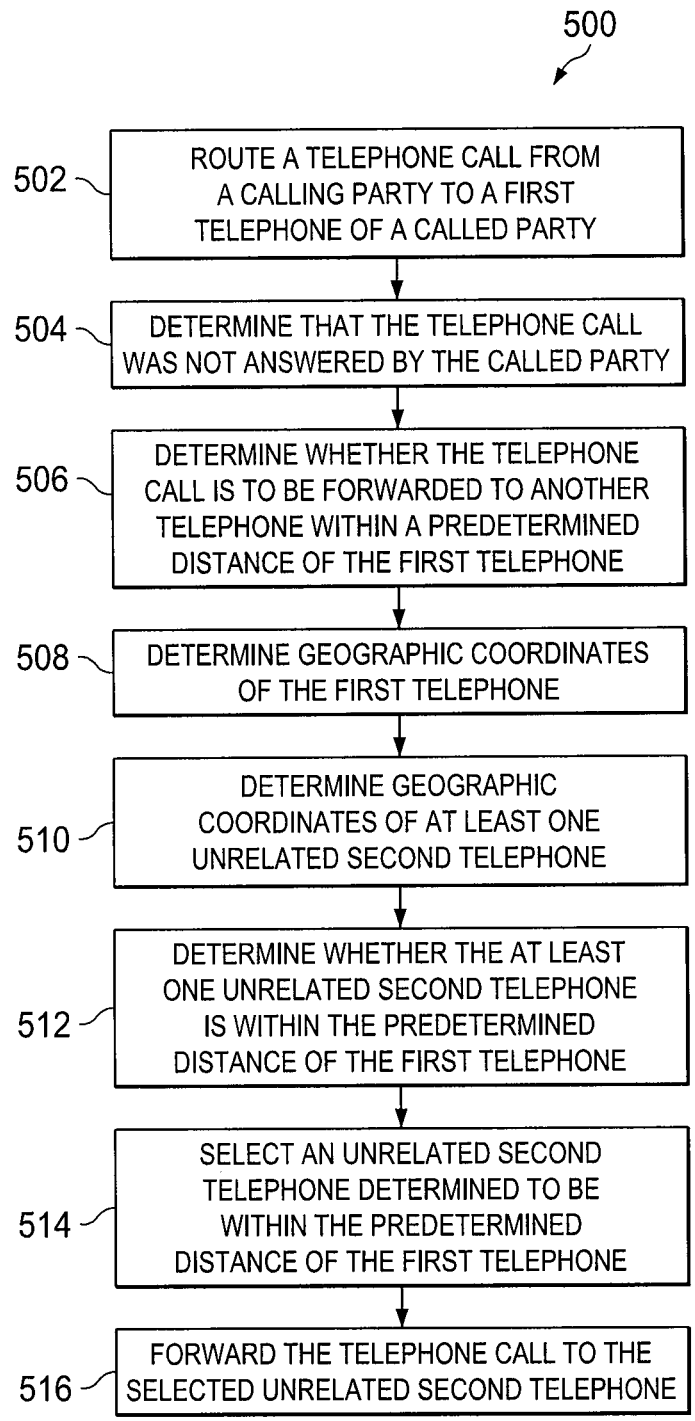
FIG. 5 is a flow diagram of an illustrative process for providing emergency call forwarding services.

With regard to FIG. 5, an illustrative emergency call forwarding process 500 is shown. The process 500 routes a telephone call at step 502 from a calling party to a first telephone of a called party. At step 504, a determination that the telephone call was not answered by the called party may be made. In determining that the telephone call was not answered, an indication that the telephone call is to be routed into voicemail may be made. A determination as to whether the telephone call is to be forwarded to another telephone within a predetermined distance of the first telephone of the called party may be made at step 506. The determination may include looking up whether the calling party has pre-established to perform a call forward for an emergency call. Alternatively or in addition, the determination may be made based on whether the called party has pre-established an indication for emergency call forwarding to be performed. In one embodiment, the pre-established indication may be made by the called party calling a network switch or entering a code into his or her telephone to set an emergency call forward flag. At step 508, geographic coordinates of the first telephone may be determined. The geographic coordinates may be GPS coordinates or otherwise.

At step 510, geographic coordinates of at least one second telephone may be determined. The geographic coordinates of the second telephone(s) may be determined through a look-up table (see TABLE I) that maintains current geographic coordinates of telephones. In being current, the geographic coordinates may be updated on a time period basis (e.g., every 30 seconds) or when the telephone transitions between network access points, for example. At step 512, a determination as to whether the at least one unrelated second telephone is within the predetermined distance of the first telephone may be made. An unrelated telephone is one that is not preestablished for forwarding a call by either the calling party or the called party. In determining the distance between the first and second telephones, the distance may be approximate as limited to the resolution of the geographic coordinates (e.g., three feet). The telephone call may be forwarded to an unrelated second telephone within the predetermined distance. Selection of the unrelated second telephone may be made at step 514 based on being closest or having the highest signal strength. In one embodiment, a telecommunications service provider may access data repositories of other telecommunications service providers to identify locations of telephones of the other telecommunications service providers to increase the chance that telephone is within the predetermined distance of the first telephone for emergency call forwarding services. The telephone call may be forwarded to the selected unrelated second telephone at step 516.

The previous detailed description is of a small number of embodiments for implementing the invention and is not intended to be limiting in scope. The following claims set forth a number of the embodiments of the invention disclosed with greater particularity.

What is claimed:

1. A method for forwarding a telephone call, said method comprising:
   routing a telephone call from a calling party to a first telephone of a called party;
   in response to determining that the telephone call was not answered by the called party and that an emergency code was received with the telephone call, determining that the telephone call is to be forwarded to another telephone within a predetermined distance of the first telephone of the called party, the another telephone being unrelated to either the calling party or the called party;
   determining geographic coordinates of the first telephone;
   determining geographic coordinates of at least one unrelated second telephone;
   determining whether the at least one unrelated second telephone is within the predetermined distance of the first telephone;
   selecting an unrelated second telephone determined to be within the predetermined distance of the first telephone;
   playing a message to a first user of the unrelated second telephone to notify the first user that the telephone call for the called party within the predetermined range of the first user is being re-routed to the second telephone because the telephone call to the first telephone was not answered;
   enabling the first user to accept or reject the telephone call;
   in response to the first user accepting the telephone call, forwarding the telephone call to the unrelated second telephone, without routing through the first telephone; and
   in response to the first user rejecting the telephone call,
      selecting an unrelated third telephone determined to be within the predetermined distance of the first telephone;
      playing a message to a second user of the unrelated third telephone to notify the second user that the telephone call for the called party within the predetermined range of the second user is being re-routed to the third telephone because the telephone call to the first telephone was not answered;
      enabling the second user to accept or reject the telephone call; and
      in response to the second user accepting the telephone call, forwarding the telephone call to the unrelated third telephone, without routing through the first telephone.

2. The method according to claim 1, further comprising determining whether the called party has activated an emergency call forwarding service.

3. The method according to claim 1, further comprising, in response to determining that the telephone call was not answered by the called party, playing a message to the calling party to enable the calling party to selectively enable the telephone call to be forwarded to the unrelated second telephone.

4. The method according to claim 1, wherein receiving the emergency call code includes receiving the emergency call code as a prefix to a telephone number of the called party.

5. The method according to claim 1, wherein determining the geographic coordinates of the first telephone includes receiving Global Positioning System (GPS) coordinates from the first telephone.

6. The method according to claim 1, wherein determining whether the telephone call is to be forwarded to the unrelated second telephone within the predetermined distance of the first telephone includes determining whether the unrelated second telephone is within approximately 30 feet.

7. The method according to claim 1, wherein forwarding the telephone call from a calling party to the unrelated second telephone includes forwarding the telephone call to a mobile telephone.

8. The method according to claim 7, wherein determining geographic coordinates of at least one unrelated second telephone includes determining geographic coordinates of at least one mobile telephone.

9. A system for forwarding a telephone call, said system comprising:
   an input/output (I/O) unit configured to communicate over a communications network;
   a storage unit configured to store a data repository, the data repository including telephone numbers of telephones and respective geographic coordinates of the telephones;
   a processing unit in communication with said I/O unit and storage unit, said processing unit configured to:
      route a telephone call from a calling party to a first telephone of a called party;
      in response to determining that the telephone call was not answered and that an emergency code was received with the telephone call, determine that the telephone call is to be forwarded to another telephone within a predetermined distance of the first telephone of the called party, the another telephone being unrelated to either the calling party or the called party;
      determine geographic coordinates of the first telephone;
      determine, from information stored in the data repository, geographic coordinates of at least one unrelated second telephone;
      determine whether the at least one second telephone is within the predetermined distance of the first telephone;
      select an unrelated second telephone determined to be within the predetermined distance of the first telephone;
      play a message to a first user of the second telephone to notify the first user that the telephone call for the called party within the predetermined range of the first user is being re-routed to the second telephone because the telephone call to the first telephone was not answered;
      enable the first user to accept or reject the telephone call;
      in response to the first user accepting the telephone call, re-route the telephone call to the unrelated second telephone, without routing through the first telephone; and
      in response to the first user rejecting the telephone call, select an unrelated third telephone determined to be within the predetermined distance of the first telephone;
         play a message to a second user of the unrelated third telephone to notify the second user that the telephone call for the called party within the predetermined range of the second user is being re-routed to the third telephone because the telephone call to the first telephone was not answered;

enable the second user to accept or reject the telephone call; and in response to the second user accepting the telephone call, reroute the telephone call to the unrelated third telephone, without routing through the first telephone.

10. The system according to claim 9, wherein said processing unit is further configured to determine whether the called party has activated an emergency call forwarding service.

11. The system according to claim 9, wherein said processing unit is further configured to, in response to determining that the telephone call was not answered by the called party, play a message to the calling party to enable the calling party to selectively enable the telephone call to be forwarded to the unrelated second telephone.

12. The system according to claim 9, wherein the emergency call code is a prefix to the telephone number of the called party.

13. The system according to claim 9, the geographic coordinates are Global Positioning System (GPS) coordinates.

14. The system according to claim 9, wherein the predetermined distance is within approximately 30 feet.

15. The system according to claim 9, wherein the unrelated second telephone is a mobile telephone.

16. The system according to claim 15, wherein the geographic coordinates of at least one second telephone are geographic coordinates of at least one mobile telephone.

* * * * *